United States Patent [19]
Berge et al.

[11] Patent Number: 5,699,582
[45] Date of Patent: *Dec. 23, 1997

[54] WINDSCREEN WIPER DEVICE WITH DRIVE HEAD TO SHAFT CONNECTION

[75] Inventors: Gilles Berge, Clairefontaine/Yvelines; Jean-Pierre Eustache, Antony; Joël Princet; Gilbert Bouy, both of Chatellerrault, all of France

[73] Assignee: Valeo Systemes De'Essuyage, France

[*] Notice: The term of this patent shall not extend beyond the expiration date of Pat. No. 5,621,943.

[21] Appl. No.: 652,296

[22] Filed: May 23, 1996

Related U.S. Application Data

[63] Continuation of Ser. No. 395,037, Feb. 27, 1995, abandoned.

[30] Foreign Application Priority Data

Feb. 28, 1994 [FR] France ................................. 94 02239

[51] Int. Cl.⁶ ........................................................ B60S 1/34
[52] U.S. Cl. .................... 15/250.34; 403/359; 403/282; 403/24
[58] Field of Search .......................... 15/250.34, 250.31, 15/250.3, 250.351, 250.352, 250.202; 403/92, 93, 94, 97, 359, 298, 24, 282, 56, 263, 256, 259, 262

[56] References Cited

U.S. PATENT DOCUMENTS

| 2,619,668 | 12/1952 | Sivacek | 15/250.34 |
|---|---|---|---|
| 2,980,453 | 4/1961 | Nesson | 15/250.34 |
| 2,994,900 | 8/1961 | Smithers | 15/250.34 |
| 3,085,821 | 4/1963 | Ryck | 15/250.34 |
| 3,429,597 | 2/1969 | Krohm | 15/250.34 |
| 4,009,901 | 3/1977 | Barbee | 15/250.34 |
| 4,502,178 | 3/1985 | Ragot et al. | 15/250.34 |
| 4,550,469 | 11/1985 | Deutscher et al. | 15/250.34 |
| 4,566,146 | 1/1986 | Harboson | 15/250.34 |

FOREIGN PATENT DOCUMENTS

| 666076 | 7/1963 | Canada | 15/250.34 |
|---|---|---|---|
| 491603 | 6/1992 | European Pat. Off. | 15/250.34 |
| 3319867 | 12/1984 | Germany | 15/250.34 |
| 3643475 | 6/1988 | Germany | 15/250.34 |
| 88663 | 5/1985 | Japan | 15/250.34 |
| 613795 | 12/1948 | United Kingdom | 15/250.34 |

*Primary Examiner*—Gary K. Graham
*Attorney, Agent, or Firm*—Morgan & Finnegan, LLP

[57] ABSTRACT

The invention proposes a windscreen wiper of the type comprising a rotating motor shaft (12) and a driving head (10) on which a windscreen wiper arm is articulated, and of the type comprising coupling means between the driving head (10) and the free end (28) of the motor shaft (12), which is mounted in a seat (22, 24) formed in the driving head (10), which comprise rotational coupling means by cooperation of shapes (42) and axial clamping means (38) comprising a unit of the screw-nut type, characterized in that the rotational coupling means by cooperation of shapes comprise a series of teeth (42) associated with the motor shaft (12), angularly distributed in a regular manner around the axis (X—X) of the motor shaft (12) and angularly spaced in relation to one another and which cooperate with an associated bearing surface (23) formed in the driving head (10).

5 Claims, 3 Drawing Sheets

WINDSCREEN WIPER DEVICE WITH DRIVE HEAD TO SHAFT CONNECTION

This is a continuation of application Ser. No. 08/395,037 filed Feb. 27, 1995 now abandoned.

FIELD OF THE INVENTION

The present invention relates to a windscreen wiper device.

The invention more particularly relates to a device of the type comprising a rotating motor shaft and a driving head on which a windscreen wiper arm is articulated, and of the type comprising coupling means between the driving head and the free end of the motor shaft, which is mounted in a seat formed in the driving head, which comprise means for coupling in rotation by cooperation of shapes and axial clamping means comprising a unit of the screw-nut type.

BACKGROUND TO THE INVENTION

According to a known design, the end of the driving shaft comprises a conical section, the surface of which is provided with a series of adjacent raised catches produced by milling which extend parallel to the axis, and a threaded end section.

The conical section is mounted in a recess having a complementary profile, with a smooth wall, formed in the driving head whereas the threaded end protrudes above the upper end of the driving head in order to be screwed into a clamping nut, the annular clamping face of which cooperates with the upper face of the driving head.

The clamping operation in the assembled position of the driving head due to the nut has the effect of causing penetration of the catches into the material forming the wall of the conical recess of the driving head.

The clamping force applied to the nut causes progressive penetration of the catches into the driving head and the catches become impressed into the wall in order to form the rotational driving means of the driving head by the motor shaft.

This particularly simple design has the drawback that it does not achieve an always adequate quality of the rotational actuation of the driving head by the motor shaft, the adjacent catches produced by milling on a conical section of the motor shaft sometimes proving to be inadequate, bearing in mind the size of the moments to be transmitted.

Furthermore, in the event of successive dismantling and reassembly of the driving head on the milled end of the motor shaft, the multiplicity of adjacent catches and the lack of depth of their impressions in the driving head do not enable the same relative angular positioning of the driving head in relation to the motor shaft to be reproduced.

SUMMARY OF THE INVENTION

In order to remove these drawbacks, the invention proposes a windscreen wiper device of the type mentioned above, in which the means for coupling in rotation by cooperation of shapes comprise a series of teeth associated with the motor shaft, angularly distributed in regular manner around the axis of the motor shaft and angularly spaced in relation to one another and which cooperate with an associated bearing surface formed in the driving head.

According to other characteristics of the invention:

- each of the teeth has a roughly triangular profile in cross section;
- each of the teeth has a triangular cross section which is roughly constant over its entire length;
- each of the teeth has a triangular cross section which varies along the tooth;
- the teeth are disposed on a surface of revolution centred on the axis of the motor shaft;
- the surface of revolution is a truncated cone;
- the bearing surface is a surface of revolution complementary to the surface of revolution on which the teeth are disposed;
- the teeth are produced in one piece with the body of the motor shaft;
- the teeth are produced on an add-on component rotationally coupled to the motor shaft; and
- the seat comprises a radial stop surface which cooperates with a radial bearing surface of the motor shaft in Order to define a precise axial position of the driving head in relation to the motor shaft.

BRIEF DESCRIPTION OF THE DRAWINGS

Other characteristics and advantages of the invention will become apparent from reading the following detailed description for the understanding of which reference will be made to the attached drawings in which.

DESCRIPTION OF THE PREFERRED EMBODIMENT

Figure 1:
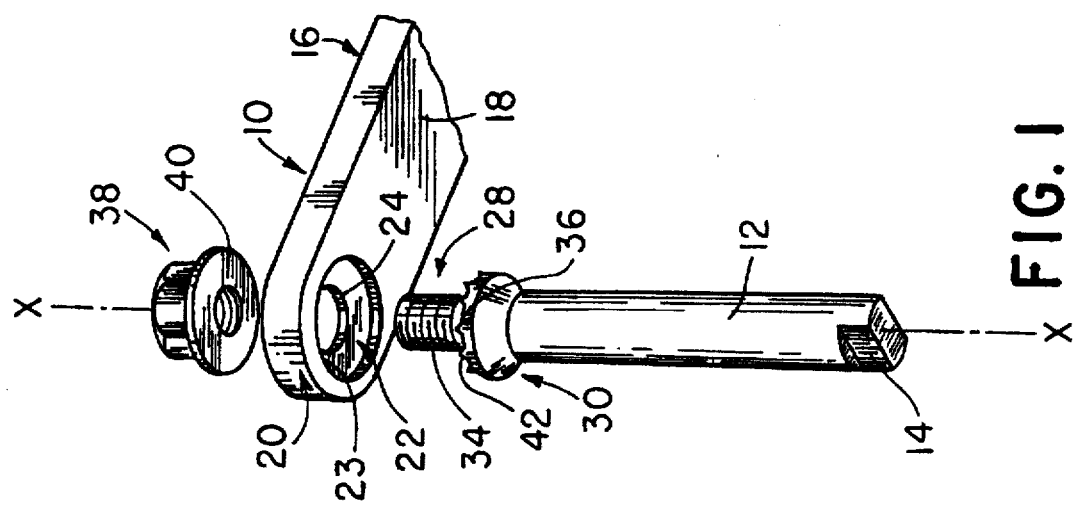
FIG. 1 is an exploded perspective view of a first embodiment of a windscreen wiper device in accordance with the teachings of the invention.

In FIG. 1 is represented a driving head 10 of a windscreen wiper arm which is mounted articulated on the driving head around an axis roughly perpendicular to the rotational driving axis X—X of the head 10.

The actuation of the head 10 is ensured by means of a rotating motor shaft 12 which comprises means 14 for its rotational actuation, around the axis X—X, by a geared motor unit (not shown) on the figures.

The driving head is a metal casting having a general elongated shape which comprises an upper face 16 and a lower face 18, which are roughly parallel and plane.

In the vicinity of its rear end 20, the driving head 10 comprises a seat 22 produced in the form of slightly conical countersinking formed in the lower face 18 which is extended by a central bore 24 which opens into the upper face 16 of the driving head 10.

The free end portion 28 of the motor shaft 12 successively comprises, vertically from the bottom upwards when studying the figures, an outer radial collar 30, a smooth coupling section 32 and a threaded cylindrical end section 34.

Figure 3:
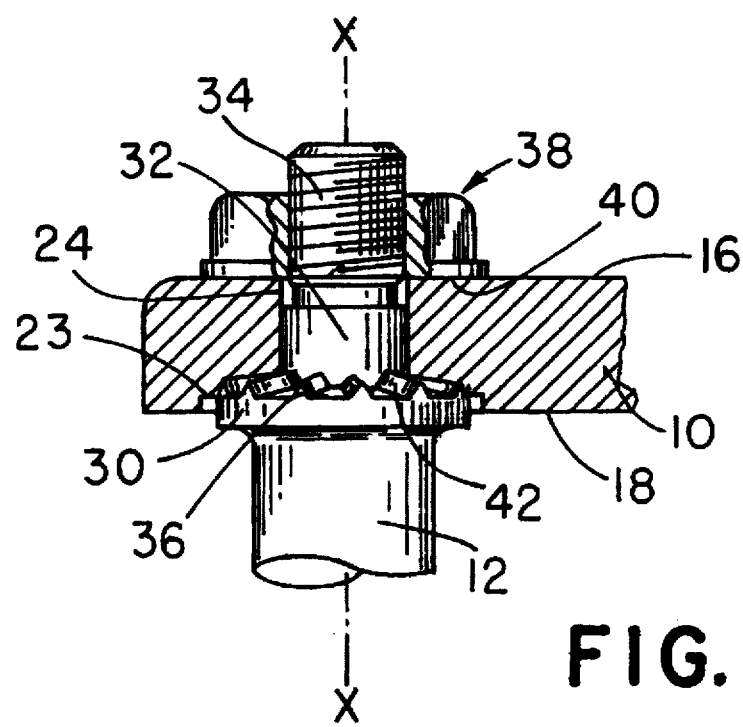
FIG. 3 is an axial sectional view of the device illustrated in the assembled and clamped position.

The slightly conical upper face 36 of the collar 30 defines a radial annular bearing surface, which in the assembled and clamped position as shown in FIG. 3, comes into contact with the stop surface formed by the complementary slightly conical base 23 of the countersinking 22.

The coupling section 32 is designed to pass through the bore 24 whereas the threaded end section protrudes beyond the upper face 16 to be screwed into a clamping nut 38, the lower annular clamping face 40 of which is designed to cooperate with the opposite portion of the upper face 16 which surrounds the bore 24.

The rotational coupling means of the driving head 10 by the motor shaft 12 are formed by a series of teeth 42 which are formed raised on the radial bearing surface 36.

The teeth 42 are angularly distributed in a regular manner around the axis X—X and they extend radially in the direction of the axis.

Each tooth has a roughly triangular section which is constant over its length and the teeth are spaced from one another by portions in the form of angular sectors of the radial bearing surface 36.

After assembling the components and their axial clamping by means of the nut 38, and as is illustrated on FIG. 3, it is noted that the teeth 42 have penetrated into the material forming the base 23 of the seat 22 and that this base 23 axially abuts, between the teeth 42, against the radial bearing surface 36, thus defining a precise axial position of the driving head 10 in relation to the driving shaft 12, i.e. a precise vertical dimension of the driving head in relation to the pane of glass to be wiped (not shown).

In the embodiment illustrated on the figure, the radial collar 30 which delimits the radial annular bearing surface 36 and which comprises the rotational driving teeth 42 is produced in one piece by forging and impact forging with the body of the motor shaft 12.

Figure 5:
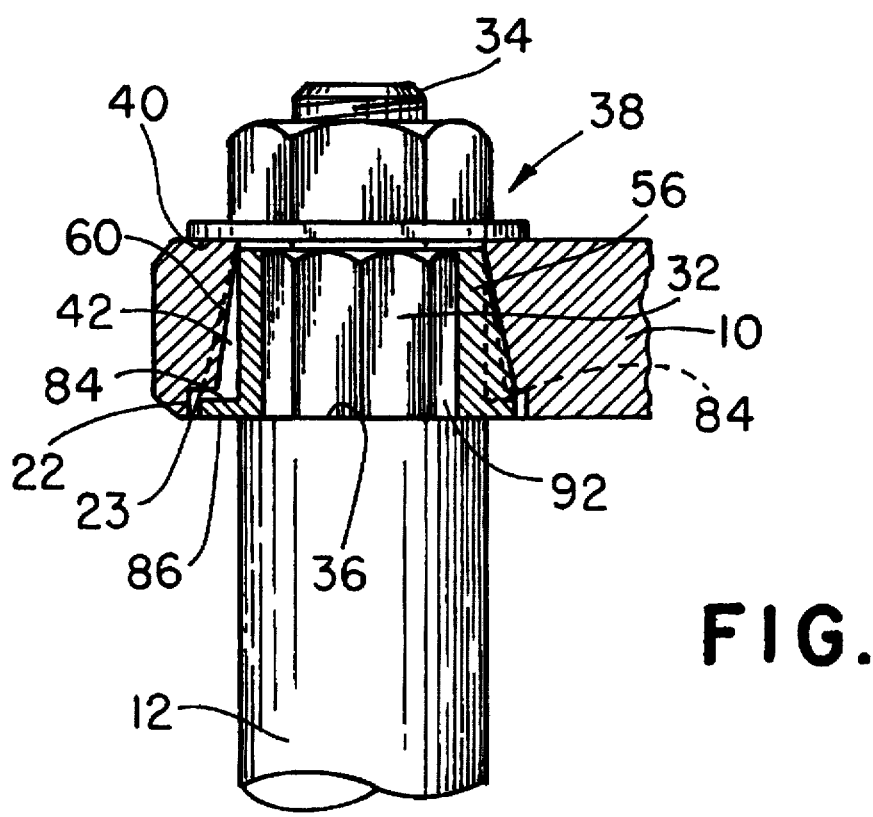
FIG. 5 is an axial sectional view of the device illustrated in FIG. 4, the components of which are illustrated in the assembled and clamped position.
Figure 4:
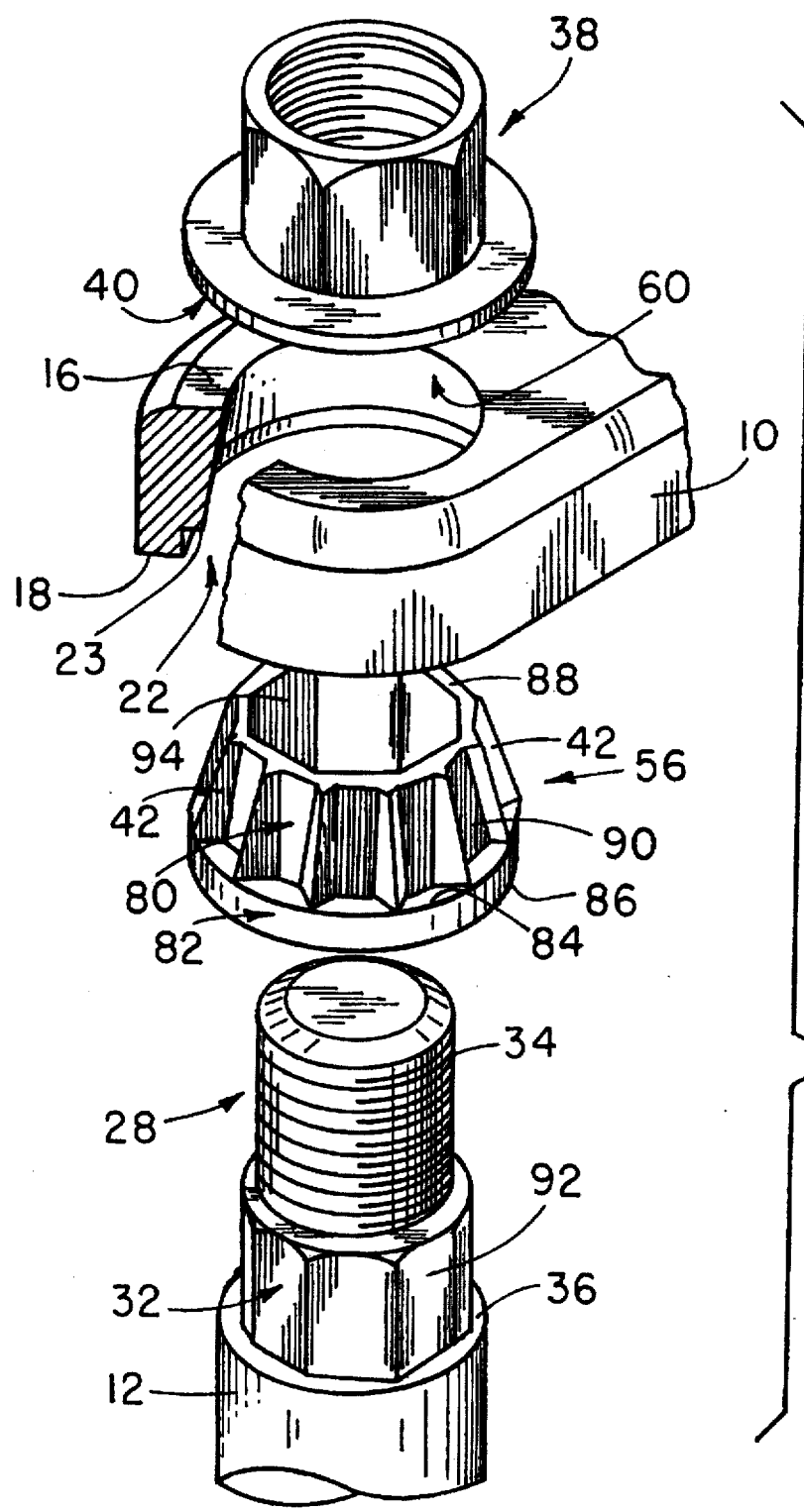
FIG. 4 is an exploded perspective view of a second embodiment of a windscreen wiper device in accordance with the teachings of the invention.

According to a refinement, not represented on the figures, the collar 30 may be produced in the form of an intermediate component attached to the end 28 of the shaft 12, of the type which will be described and represented later with reference to the third embodiment illustrated in FIGS. 4 and 5.

Apart from the excellent quality of the rotational coupling of the driving head 10 with respect to the motor shaft 12, in the event of dismantling and reassembly, the design of the triangular, spaced teeth 42 enables the driving head to be repositioned angularly in a precise manner in relation to the rotating shaft 12 by placing the teeth 42 to correspond with the impressions which they previously imprinted in the base 23 of the seat 22 during the first assembly and clamping operation.

Figure 2:
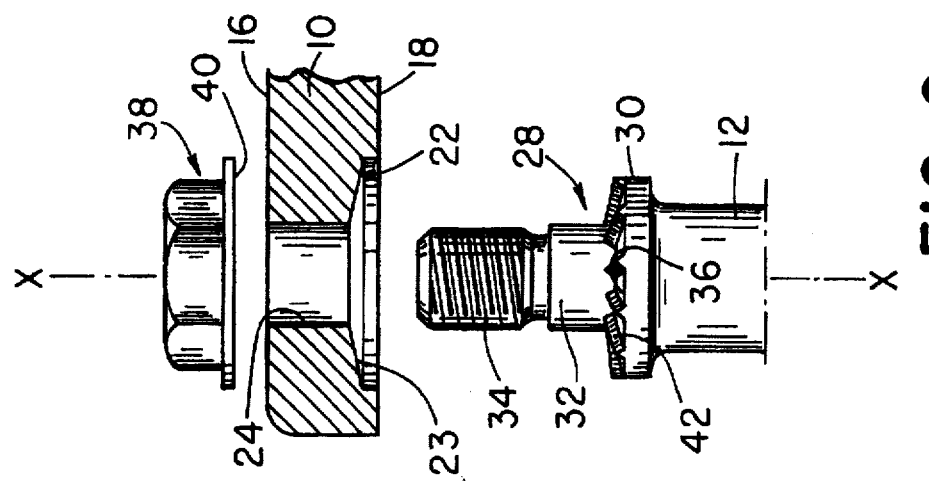
FIG. 2 is an exploded axial sectional view of the components of the device illustrated in FIG. 1.

Now the second embodiment shown in FIGS. 4 and 5 will be described, in which components identical or similar to those illustrated in FIGS. 1 to 3 are designated by the same reference numbers.

In this second embodiment, the bearing of the annular stop surface 23 formed in a lower countersinking 22 formed in the lower face 18 of the driving head 10 on the radial annular bearing surface 36 formed at the free end 28 of the motor shaft 12 is an indirect bearing which is performed via the intermediate coupling element 56.

For this purpose an intermediate component 56 is provided in a recess 60 which opens into the lower face 18 of the driving head 10 and which ends in the countersinking 22 defining the radial annular stop surface 23.

The intermediate component 56 is essentially composed of a roughly cylindrical annular skirt 80 which is extended at its lower part by an outer radial collar 82 which is designed to be mounted in the countersinking 22 and the upper annular radial face 84 of which is designed to come to bear axially against the radial annular stop surface 23.

The lower annular radial face 86 of the outer radial collar 82 is designed to come to bear against the radial annular bearing surface 36 formed on the free end 28 of the motor shaft 12.

The teeth 42 are angularly distributed in a regular manner along the outer wall of the skirt 80 of the intermediate coupling component 86 and they have a triangular section which becomes thinner from the lower collar 42 to the free upper edge 88 of the skirt 80 so as to form wedges which will penetrate progressively into the material forming the wall of the recess 60 at the time of the first clamping operation.

The teeth are distributed regularly and are spaced by cylindrical portions 90 of the skirt 80.

The axial clamping of the unit is ensured by means of a nut 38, the lower annular clamping face 40 of which cooperates with the upper face 16 of the driving head 10 and which is screwed onto the threaded free end 34 of the motor shaft 12 which protrudes axially beyond the upper face 16.

At the time of the first assembly and clamping operation, the operator performs a tightening of the nut 38 until the teeth 42 penetrate into the wall of the recess 60 and until the radial annular stop surface 23 comes to bear against the upper annular face 84 of the outer radial collar 82 of the intermediate rotational coupling piece 56.

Once axial clamping has been performed, the relative axial position of the driving head 10 in relation to the shaft 12 is precisely ensured because of the mutual bearing of the surfaces 23 and 84 and of the surfaces 86 and 36.

The rotational coupling between the intermediate component 56 and the end portion 28 of the shaft 12 is ensured by the cooperation of complementary shapes. For this purpose, the intermediate section 32 of the free end 28 of the motor shaft 12 comprises a series of flat surfaces 92 and it is mounted inside the skirt 90 of the intermediate rotational coupling component 56 which comprises corresponding flat surfaces 94.

In this embodiment, in the event of the driving head being dismantled, the intermediate component 56 remains in place in its seat 60, and angular indexing of the driving head 10 with respect to the shaft 12 is ensured by the rotational coupling means 46–68 or 92–94 of the intermediate component 56 with the shaft 12.

What we claim is:

1. A windshield wiper assembly, said assembly comprising:

an elongated, rotatable motor shaft defining a longitudinal axis, said motor shalt includes a cylindrical main portion, a first free end portion and a second flee end portion, the cylindrical main portion has a first outer diameter and the second free end portion includes means for rotational articulation of said motor shaft by a geared motor unit, said first free end portion includes;

an outer radial collar connected with and adjacent to said main portion, said outer radial collar defining a first cylindrical outer edge surface substantially parallel with said axis and having a second outer diameter greater than said first diameter, and a conical face which defines a radial annular bearing surface, said conical face includes a plurality of teeth projecting therefrom and radially spaced about said conical face, said teeth each having a length, said teeth having a generally triangular profile in cross-section that is parallel with said motor shaft;

a cylindrical coupling section connected with and adjacent to said outer radial collar, said coupling section defines a cylindrical, smooth outer surface having a third outer diameter less than said first diameter, wherein said plurality of teeth extend from said outer edge surface to said smooth outer surface;

a threaded cylindrical end section connected with and adjacent to said cylindrical coupling section, said end section having external threads thereon and having a fourth outer diameter less than said first diameter;

a driving head of a windshield wiper arm, said head having first and second substantially parallel faces, said first face has a conical countersinking formed therein which defines a radial stop surface and a second cylindrical outer edge surface substantially parallel with said axis, said second face has a cylindrical bore formed therein which is aligned with and extends into said conical countersinking;

a threaded nut, said nut includes a clamping face;

said free end portion of said shaft is coupled to said driving head, wherein said threaded end section passes through the cylindrical bore to extend from said first face such that the cylindrical coupling section lies within said bore, said threaded nut engages said threaded end section, with said clamping face engaging said first face of said head thus providing axial clamping force such that said teeth are embedded into said conical countersinking and the radial annular bearing surface engages said radial stop surface.

2. The windscreen wiper driving device according to claim 1 wherein the triangular cross section of each of said teeth is roughly constant over said length around said motor shaft axis.

3. The windscreen wiper driving device according to claim 1 wherein said conical face is centered on said axis of said motor shaft.

4. The windscreen wiper driving device according to claim 3 wherein said radial stop surface is a surface of revolution that is complementary to said conical face.

5. The windscreen wiper driving device according to claim 1 wherein said teeth are formed directly on said conical face.

* * * * *